United States Patent [19]

Shigaki et al.

[11] Patent Number: 4,764,942

[45] Date of Patent: Aug. 16, 1988

[54] SLIP CONTROL IN A PLESIOCHRONOUS BUFFER CIRCUIT TO REDUCE DISTORTION OF TWO KINDS OF DATA SIGNALS

[75] Inventors: Seiichiro Shigaki; Minoru Matsuoka; Osamu Ookoshi, all of Tokyo, Japan

[73] Assignee: NEC Corporation, Tokyo, Japan

[21] Appl. No.: 884,919

[22] Filed: Jul. 14, 1986

[30] Foreign Application Priority Data

Jul. 12, 1985 [JP] Japan .................................. 60-152541

[51] Int. Cl.$^4$ ............................................... H04L 7/00
[52] U.S. Cl. ....................................... 375/118; 370/105
[58] Field of Search ................ 375/118; 370/103, 104, 370/105

[56] References Cited

U.S. PATENT DOCUMENTS

| | | | |
|---|---|---|---|
| 3,928,726 | 12/1975 | Colton et al. | 370/105 |
| 3,984,641 | 10/1976 | Ruyter | 375/118 |
| 4,429,386 | 1/1984 | Graden | 375/118 |

FOREIGN PATENT DOCUMENTS 254938 12/1985 Japan .................................. 375/118

Primary Examiner—Edward L. Coles, Sr.
Assistant Examiner—Michael D. Parker
Attorney, Agent, or Firm—Foley & Lardner, Schwartz, Jeffery, Schwaab, Mack, Blumenthal & Evans

[57] ABSTRACT

For a buffer memory used in a plesiochronous buffer circuit for reception of a PCM signal at station clocks and transmission thereof at satellite clocks, first and secod partial write control arrangements control writing of first and second parts of each frame of each multiframe of the PCM signal, respectively, in accordance with the station clocks. First and second partial read controlling arrangements control reading of the buffer memory for the first and the second parts, respectively, in accordance with the satellite clocks. The buffer circuit is likewise operable when such a PCM signal is received at the satellite clocks. In this manner, the buffer circuit individually deals with the first and the second parts. Preferably, first and second comparing circuits produce first and second slip control signals, respectively, when the reading becomes near relative to the writing than one multiframe and one frame to slip the reading relative to the writing.

3 Claims, 4 Drawing Sheets

SLIP CONTROL IN A PLESIOCHRONOUS BUFFER CIRCUIT TO REDUCE DISTORTION OF TWO KINDS OF DATA SIGNALS

BACKGROUND OF THE INVENTION

This invention relates to a plesiochronous buffer circuit which is for use in an earth station in coupling a domestic digital network and a satellite network, which is typically a TDMA (time division multiple access) satellite network.

A plesiochronous buffer circuit comprises a buffer memory, which is often called a doppler buffer memory in the art. The buffer memory is for compensating during transmission and reception of a PCM (pulse code modulation) signal for a clock frequency difference between clock frequencies used in the domestic digital and the satellite networks.

Clocks of the clock frequency used in the domestic digital network, are herein called station clocks. Those of the clock frequency used in the satellite network, are called satellite clocks. A typical PCM signal comprises a plurality of frames each of which comprises a particular data signal.

A conventional plesiochronous buffer circuit is disclosed for use in buffering the particular data signal by Yasuo Hirata et al in a Japanese technical paper, "Kokusai Tûsin no Kenkyû" (Study of International Communication) No. 114 (October 1982), pages 25–39, under the title of "Pureziokuronasu Mökan Setsuzoku-sochi no Kaihatsu" (Development of a Coupling Device between Plesiochronous Networks). The buffer circuit of Hirata et al comprises a write controlling arrangement which controls writing of the buffer memory for the particular data signal in accordance with the satellite clocks when the PCM signal is received through the satellite network. A read controlling arrangement controls reading of the buffer memory for the particular data signal in accordance with the station clocks. A comparing circuit compares writing and reading phase signals which are produced by the write and the read controlling arrangements, respectively. The writing and reading phase signals are produced at write and read timings of the particular data signal in and from the buffer memory, respectively. The comparing circuit produces a slip control signal when the writing and the reading phase signals become nearer to each other than a preselected time interval. The read controlling arrangement responds to the slip control signal and carries out a slip control such that the particular data signal is read from the buffer memory at a slipped timing displaced relative to the read timing by one frame. That is, either repeat or deletion of one frame is carried out for the particular data signal by the slip control.

It is a recent trend that a PCM signal of a different format is used in a communication network. The PCM signal comprises a plurality of multiframes each of which comprises a predetermined number of frames. Each frame comprises first and second parts to which information is assigned at every multiframe and at every frame, respectively. More particularly, the first part of a predetermined one of the frames of each multiframe comprises a multiframe synchronization or alignment signal. The first part of each of the other frames of each multiframe comprises a first data signal. The second part comprises a second data signal which corresponds to the above-mentioned particular data signal. In each frame, the first and the second data signals appear in different periods. A significant word is defined in each multiframe by the first parts of the predetermined number.

On reception of the PCM signal of the different format, the buffer circuit of Hirata et al is capable of carrying out the slip control for the second part to reduce distortion of the second data signal. This is because either repeat or deletion of one frame is carried out for the second part to which information is assigned at every frame. However, the repeat or the deletion of one frame is not applied to the first part to which information is assigned at each multiframe. This is because the number of the frames of each multiframe is defined as the predetermined number. When the repeat or the deletion of one frame is applied to the first part, the number of the frames of each multiframe becomes different from the predetermined number.

According to INTELSAT EARTH STATION STANDARDS (IESS), Document IESS-309 published on July 1, 1985, any slip shall be a multiple of one frame period. In order to realize the slip control for the first and the second parts, attempts may be made to repeat and delete one multiframe in view of the standard set up in the Document IESS-309. Such repeat and deletion of one multiframe may enable a reduction of distortion of the first data signal assigned to the first part. However, distortion is inevitable for the second data signal assigned to the second part at every frame.

SUMMARY OF THE INVENTION

It is therefore an object of this invention to provide a plesiochronous buffer circuit which is capable of individually dealing with first and second data signals which appear in different periods.

It is another object of this invention to provide a plesiochronous buffer circuit of the type described, which is capable of reducing distortion of the first and the second data signals.

Other objects of this invention will become clear as the description proceeds.

A plesiochronous buffer circuit to which this invention is applicable is for use in an earth station in coupling a domestic digital network and a satellite network. The domestic digital network is operable in synchronism with a series of station clocks having a first clock frequency. The satellite network is operable in synchronism with a series of satellite clocks having a second clock frequency. The buffer circuit comprises a buffer memory for compensating for a clock frequency difference between the first and the second clock frequencies when the buffer circuit receives a PCM signal through one of the domestic digital and the satellite networks and transmits the PCM signal to the other of the domestic digital and the satellite networks. The PCM signal comprises a plurality of multiframes each of which comprises a predetermined number of frames. Each frame comprises a first and a second part. The first part of a predetermined one of the frames of each multiframe comprises a multiframe synchronization signal. The first part of each of the other frames of each multiframe comprises a first data signal. The second part comprises a second data signal. According to this invention, the plesiochronous buffer circuit comprises write controlling means for controlling writing individually for the first and the second parts of the buffer memory in accordance with the station clocks and the satellite clocks when the PCM signal is received through the domestic digital and the satellite networks, respectively, and read controlling means for controlling reading of the buffer memory individually for the first and the second parts in accordance with the station clocks and the satellite clocks when the PCM signal is transmitted to the domestic digital and the satellite networks, respectively.

DESCRIPTION OF THE PREFERRED EMBODIMENT

Figure 1:
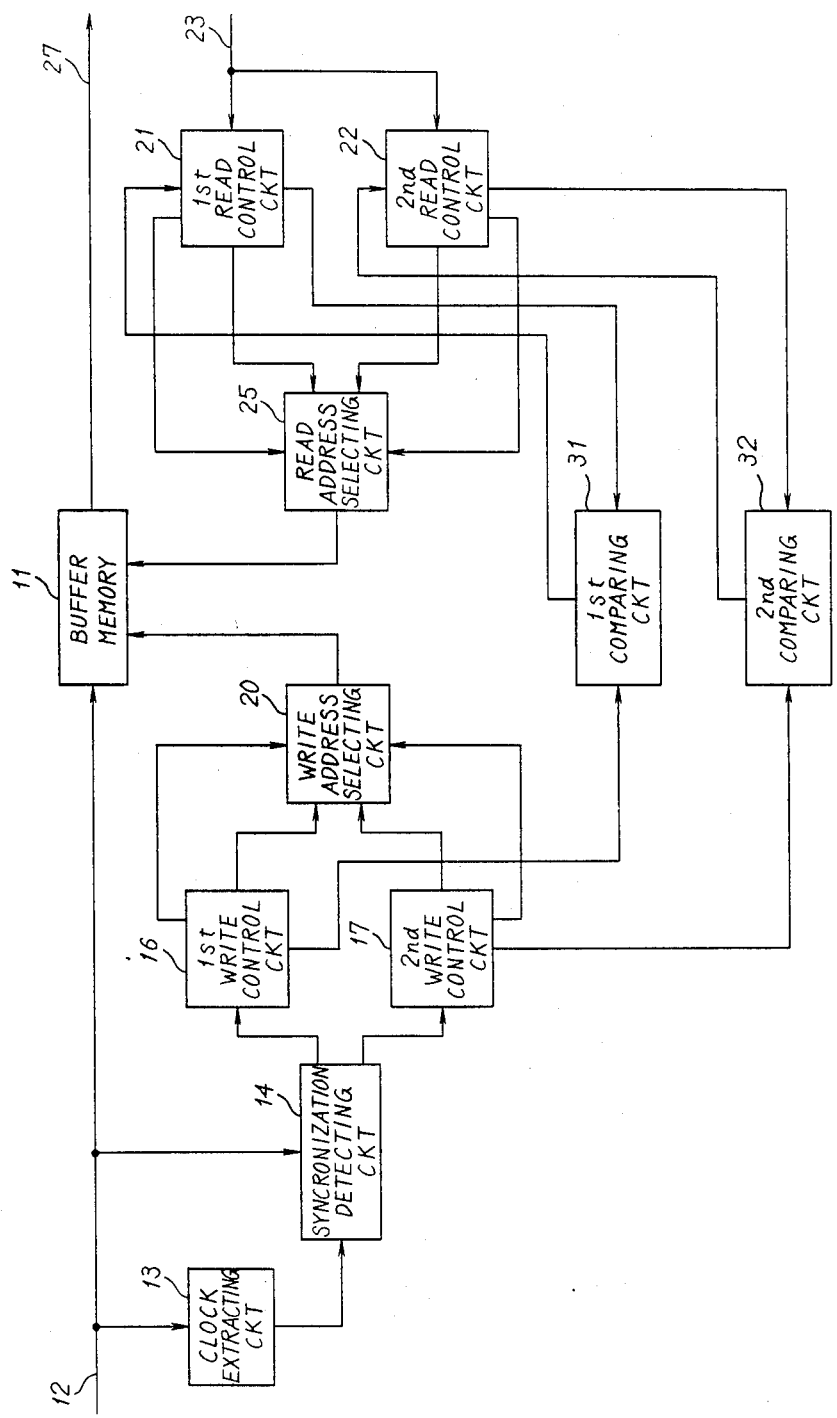
FIG. 1 is a block diagram of a plesiochronous buffer circuit according to an embodiment of this invention.

Referring to FIG. 1, a plesiochronous buffer circuit is for use in an earth station in coupling a domestic digital network and a satellite network, such as a TDMA satellite network. The domestic digital and the satellite networks will later be described with reference to the figure being referred to. The domestic digital network is operable in synchronism with a series of station clocks which have a first clock frequency. The satellite network is operable in synchronism with a series of satellite clocks which have a second clock frequency.

The plesiochronous buffer circuit comprises a buffer memory 11 for compensating for a clock frequency difference between the first and the second clock frequencies when the plesiochronous buffer circuit receives a PCM signal 12 through one of the domestic digital and the satellite networks and transmits the PCM signal to the other of the domestic digital and the satellite networks.

The earth station comprises a pair of such plesiochronous buffer circuits for the domestic digital and the satellite networks. When the PCM signal 12 is received through the domestic digital network, it is possible to understand that the reference numeral 12 also indicates the domestic digital network. Similarly, it is possible to understand that the reference numeral 12 indicates the satellite network when the PCM signal 12 is received through the satellite network.

Figure 2:
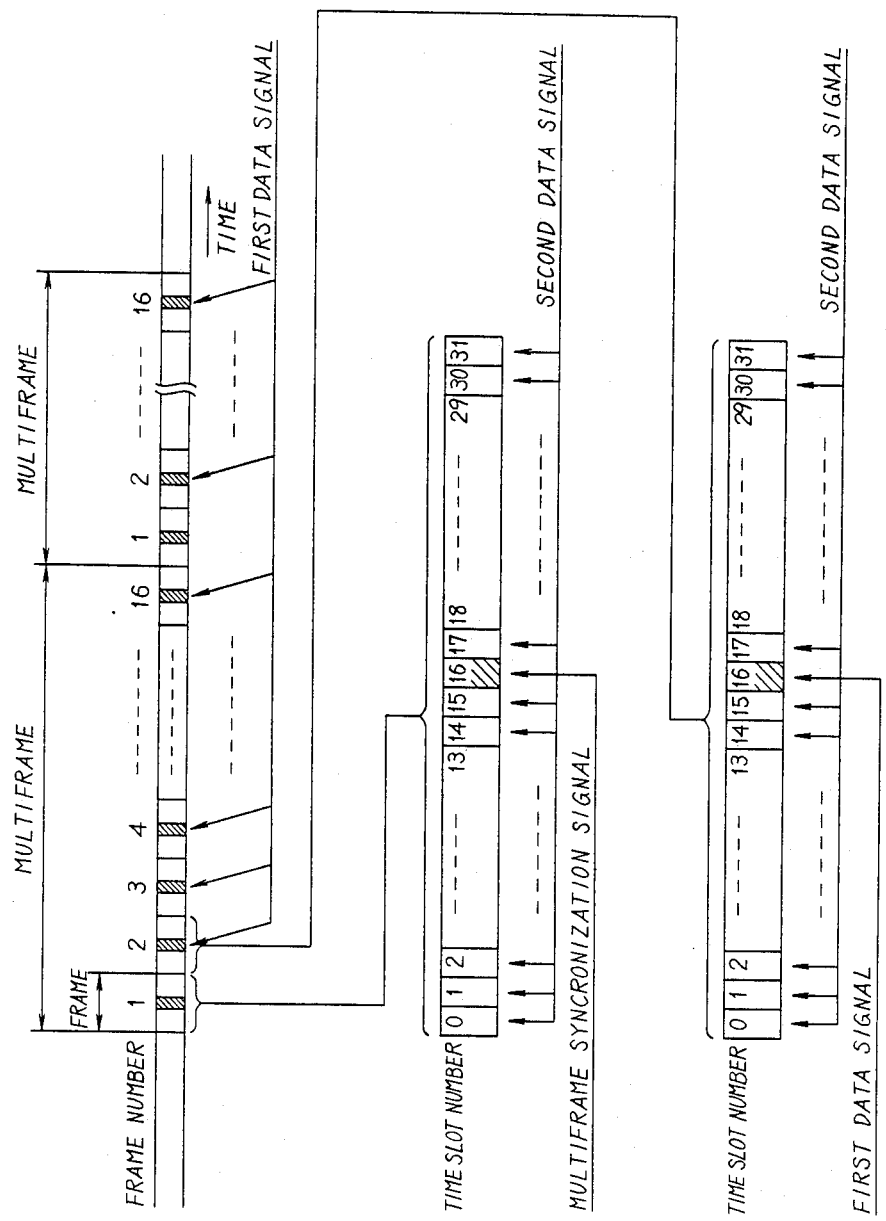
FIG. 2 is a signal format of a PCM signal for use in describing operation of the plesiochronous buffer circuit illustrated in FIG. 1.

Turning to FIG. 2, a signal format of the PCM signal will now be described. The signal format is for a digital network of a 2048 kbps PCM primary group which is set up in CCITT (The International Telegraph and Telephone Consultive Committee) Recommendation G704 in Red Book, VOLUME III-FASCICLE III.3, in the VIII-th Plenary Assembly held at Malaga-Torremolinos on the 8-19th October, 1984.

The PCM signal comprises a plurality of multiframes as depicted along the top line. Each of the multiframes is, for example, two milliseconds long. Each multiframe comprises a predetermined number of frames which are exemplified by first through sixteenth frames. Each frame consists of thirty-two time slots which are exemplified by zeroth through thirty-first time slots as depicted along the middle and the bottom lines.

Each frame comprises first and second parts. The first part is indicated with hatches and assigned to the sixteenth time slot in each frame (the middle and the bottom lines). The second part is assigned to the remaining time slots in each frame, that is, the zeroth through the fifteenth and the seventeenth through the thirty-first time slots.

The first part of the first frame of the frames of each multiframe comprises a multiframe synchronization or alignment signal in the manner depicted on the middle line. The multiframe synchronization signal is representative of the first frame of each multiframe. The first part of each of the other frames of each multiframe comprises a first data signal as depicted on the top and the bottom lines. The second part comprises a second data signal as depicted on the middle and the bottom lines. Each time slot is assigned to eight-bit data of one of the multiframe synchronization, the first data, and the second data signals.

Description will now be made as regards difference between the first and the second data signals. In each frame illustrated in the middle and the bottom lines of FIG. 2, the second data signal comprises a frame synchronization or alignment signal at a leading time slot, that is, the zeroth time slot. In other words, the frame synchronization signal indicates the leading or the first time slot of each of the first through the sixteenth frames. The second data signal also comprises first through thirtieth telephone voice signals of first through thirtieth communication channels at the first through the fifteenth and the seventeenth through thirty-first time slots, respectively. It will be understood from the above that information due to the second data signal is assigned to the second part at every frame.

In each of the second through the sixteenth frames of each multiframe, the first data signal comprises signalling data, such as dial signals or the like, at the sixteenth time slot for the telephone voice signals of the first through the thirtieth communication channels in the manner which will presently be described. The signalling data for each of the first through the fifteenth communication channels are assigned to a first four-bit part of a first half of the sixteenth time slot. The signalling data for each of the sixteenth through the thirtieth communication channels are assigned to a last four-bit part of the sixteenth time slot. More particularly, the signalling data for the first, the second, . . . , the fourteenth, and the fifteenth communication channels are assigned to the first halves of the sixteenth time slots of the second through the sixteenth frames of each multiframe, respectively. The signalling data for the sixteenth, the seventeenth, . . . , the twenty-ninth, and the thirtieth communication channels are assigned to the second halves of the sixteenth time slots of the second through the sixteenth frames of each multiframe, respectively. As is apparent from the above, information due to the first data signals is assigned to the first parts at every multiframe.

Referring back to FIG. 1, the buffer memory 11 has first and second buffer areas for buffering the first and the second parts, respectively. The first and the second buffer areas have first and second buffer or memory capacities capable of keeping or memorizing the first and the second parts, respectively, which are included in four multiframes. The first and the second buffer capacities are decided so as to compensate for the effects caused by satellite movement.

The plesiochronous buffer circuit comprises a clock extracting circuit 13 which responds to the PCM signal 12 and extracts one of the series of the station and the satellite clocks from the PCM signal 12 to produce a series of extracted clocks depending on which of the domestic digital and the satellite networks the PCM signal 12 is received through. A synchronization detecting circuit 14 responds to the series of extracted clocks and the PCM signal 12 and detects the multiframe synchronization signal and the frame synchronization signal of the PCM signal 12 to produce first and second synchronous signals with reference to the series of extracted clocks. The first synchronous signal is synchronized with the multiframe synchronization and the first data signals of the first parts. The second synchronous signal is synchronized with the second data signals. Thus, the plesiochronous buffer circuit is synchronized with the PCM signal 12 at every multiframe.

A first write control circuit 16 responds to the first synchronous signal and produces a first write address signal for the multiframe synchronization and the first data signals of the first parts. The first write address signal is representative of the first buffer area. The first write control circuit 16 further produces a first write address selection command signal indicative of the presence of the multiframe synchronization and the first data signals and a first writing phase signal which will later be described. A second write control circuit 17 responds to the second synchronous signal and produces a second write address signal for the second data signal of the second part. The second write address signal is representative of the second buffer area. The second write control circuit 17 further produces a second write address selection command signal indicative of the presence of the second data signal and a second writing phase signal which will later be described.

In the manner described before, the first and the second parts appear in different time slots. Responsive to the first write address selection command signal and the first write address signal delivered from the first write control circuit 16 through two of three output leads depicted in FIG. 1, respectively, a write address selecting circuit 20 selects the first write address signal as a selected write address signal. Likewise, the write address selecting circuit 20 selects the second write address signal as the selected write address signal when the second write address selection command signal is supplied from the second write control circuit 17. The write address selecting circuit 20 delivers the selected write address signal to the buffer memory 11.

Thus, the first and the second parts included in the PCM signal 12 are individually written in the first and the second buffer areas of the buffer memory 11 under control of the selected write address signal of the write address selecting circuit 20, respectively.

As is apparent from the above, a combination of the synchronization detecting circuit 14, the first and the second write control circuits 16 and 17, and the write address selecting circuit 20 serves as a write controlling arrangement individually for the first and the second parts for controlling writing of the buffer memory 11 in accordance with the station clocks and the satellite clocks when the PCM signal 12 is received through the domestic digital and the satellite networks, respectively. More particularly, a combination of the synchronization detecting circuit 14, the first write control circuit 16, and the write address selecting circuit 20 serves as a first partial write controlling arrangement for controlling writing for the first part of the buffer memory 11 in accordance with the station clocks and the satellite clocks when the PCM signal 12 is received through the domestic digital and the satellite networks, respectively.

On the other hand, a combination of the synchronization detecting circuit 14, the second write control circuit 17, and the write address selecting circuit 20 serves as a second partial write controlling arrangement for controlling writing for the second part of the buffer memory 11 in accordance with the station clocks and the satellite clocks when the PCM signal 12 is received through the domestic digital and the satellite networks, respectively.

As mentioned before, the first and the second write control circuits 16 and 17 produces the first and the second writing phase signals, respectively. The first writing phase signal is produced at a first write timing of writing the first part in the first buffer area of the buffer memory 11. Similarly, the second writing phase signal is produced at a second write timing of writing the second part in the second buffer area of the buffer memory 11. More particularly, the first writing phase signal is produced when the first write control circuit 16 produces the first write address signal which represents a leading address of the first buffer area of the buffer memory 11. The first write address signal representative of the leading address is produced once for four multiframes. This is because the first capacity of the first buffer area is equal to a memory capacity capable of keeping the first parts included in four multiframes as mentioned before. Likewise, the second writing phase signal is produced when the second write control circuit 17 produces the second write address signal which represents a leading address of the second buffer area of the buffer memory 11. The second write address signal representative of the latter-mentioned leading address is produced once for four multiframes. This is because the second buffer area has the second capacity capable of keeping the second parts included in four multiframes as described before.

Thus, the first write control circuit 16 serves as a first writing phase signal producing section which is for producing a first writing phase signal at a first write timing of writing the first part in the buffer memory 11. The second write control circuit 17 serves as a second writing phase signal producing section for producing a second writing phase signal at a second write timing of writing the second part in the buffer memory 11.

First and second read control circuits 21 and 22 respond to another series of extracted clocks 23 extracted from either the domestic digital network or the satellite network. The extracted clocks 23 correspond to the station clocks when the PCM signal 12 is received through the satellite network and is transmitted to the domestic digital network. On the other hand, the extracted clocks 23 correspond to the satellite clocks when the PCM signal 12 should be transmitted to the satellite network.

Responsive to the extracted clocks 23, the first read control circuit 21 produces a first read address signal for the multiframe synchronization and the first data signals of the first parts in the manner which will be understood as the description proceeds. The first read address signal is representative of the first buffer area. The first read control circuit 21 further produces a first read address selection command signal indicative of the time slots of the multiframe synchronization and the respective first data signals of each multiframe. That is, the first read address selection command signal indicates the sixteenth time slot (FIG. 2) of each of the frames of each multiframe. The first read control circuit 21 still further produces a first reading phase signal which will later be described.

On the other hand, the second read control circuit 22 produces a second read address signal for the second data signal of the second part. The second read address signal is representative of the second buffer area. The second read control circuit 22 further produces a second read address selection command signal indicative of the time slots of the respective second data signals of each multiframe. That is, the second read address selection command signal indicates the time slots of each of the frames of each multiframe except the sixteenth time slot of each frame. The second read control circuit 22 still further produces a second reading phase signal which will later be described.

Responsive to the first read address selection command signal and the first read address signal delivered from the first read control circuit 21 through two of three output leads depicted in FIG. 1, respectively, a read address selecting circuit 25 selects the first read address signal as a selected read address signal. Likewise, the read address selecting circuit 25 selects the second read address signal as the selected read address signal when the second read address selection command signal is supplied from the second read control circuit 22. The read address selecting circuit 25 delivers the selected read address signal to the buffer memory 11.

Thus, the first and the second parts are individually read from the first and the second buffer areas of the buffer memory 11 under control of the selected read address signal of the read address selecting circuit 25, respectively, and collectively transmitted to one of the domestic digital and the satellite networks as a PCM signal 27. It is now understood that the PCM signal 27 should be transmitted to the domestic digital network and indicates the domestic digital network when the first-mentioned PCM signal 12 is received through the satellite network.

As is apparent from the above, a combination of the first and the second read control circuits 21 and 22 and the read address selecting circuit 25 is operable as a read controlling arrangement for controlling reading of the buffer memory individually for the first and the second parts in accordance with the station clocks and the satellite clocks when the PCM signal 27 is transmitted to the domestic digital and the satellite networks, respectively. More specifically, a combination of the first read control circuit 21 and the read address selecting circuit 25 is operable as a first partial read controlling arrangement for controlling reading of the buffer memory 11 for the first part in accordance with the station clocks and the satellite clocks when the PCM signal 27 is transmitted to the domestic digital and the satellite networks, respectively. On the other hand, a combination of the second read control circuit 22 and the read address selecting circuit 25 is operable as a second partial read controlling arrangement for controlling reading of the buffer memory 11 for the second part in accordance with the station clocks and the satellite clocks when the PCM signal 27 is transmitted to the domestic digital and the satellite networks, respectively.

As described above, the first and the second read control circuits 21 and 22 produce the first and the second reading phase signals, respectively. The first reading phase signal is produced at a first read timing of reading the first part from the first buffer area of the buffer memory 11. Similarly, the second reading phase signal is produced at a second reading timing of reading the second part from the second buffer area of the buffer memory 11. More specifically, the first reading phase signal is produced when the first read control circuit 21 produces the first read address signal which represents the above-mentioned leading address of the first buffer area of the buffer memory 11. The first read address signal representative of the leading address is produced once for four multiframes like the above-mentioned first write address signal representative of the leading address. Likewise, the second reading phase signal is produced when the second read control circuit 22 produces the second read address signal which represents the above-mentioned other leading address of the second buffer area of the buffer memory 11. The second read address signal representative of the other leading address is produced once for four multiframe like the above-mentioned second write address signal representative of the other leading address.

Thus, the first read control circuit 21 serves as a first reading phase signal producing section which is for producing a first reading phase signal at a first read timing of reading the first part from the buffer memory 11. The second read control circuit 22 serves as a second reading phase signal producing section which is for producing a second reading phase signal at a second read timing of reading the second part from the buffer memory 11.

A first comparing circuit 31 compares the first writing and the first reading phase signals to produce a first slip control signal when the first writing and the first reading phase signals become nearer to each other than a first predetermined time interval. The first predetermined time interval is equal to a time interval corresponding to one multiframe. Similarly, a second comparing circuit 32 compares the second writing and the second reading phase signals to produce a second slip control signal when the second writing and the second reading phase signals become nearer to each other than a second predetermined time interval which is equal to one frame.

Responsive to the first slip control signal, the first read control circuit 21, namely, the above-mentioned first partial read controlling arrangement, carries out a first slip control such that the first part is read from the buffer memory 11 at a first slipped timing displaced or slipped relative to the first read timing by one multiframe. Similarly, the second read control circuit 22 or the above-mentioned second partial read controlling arrangement responds to the second slip control signal and carries out a second slip control such that the second part is read from the buffer memory 11 at a second slipped timing displaced relative to the second read timing by one frame.

Figure 3:
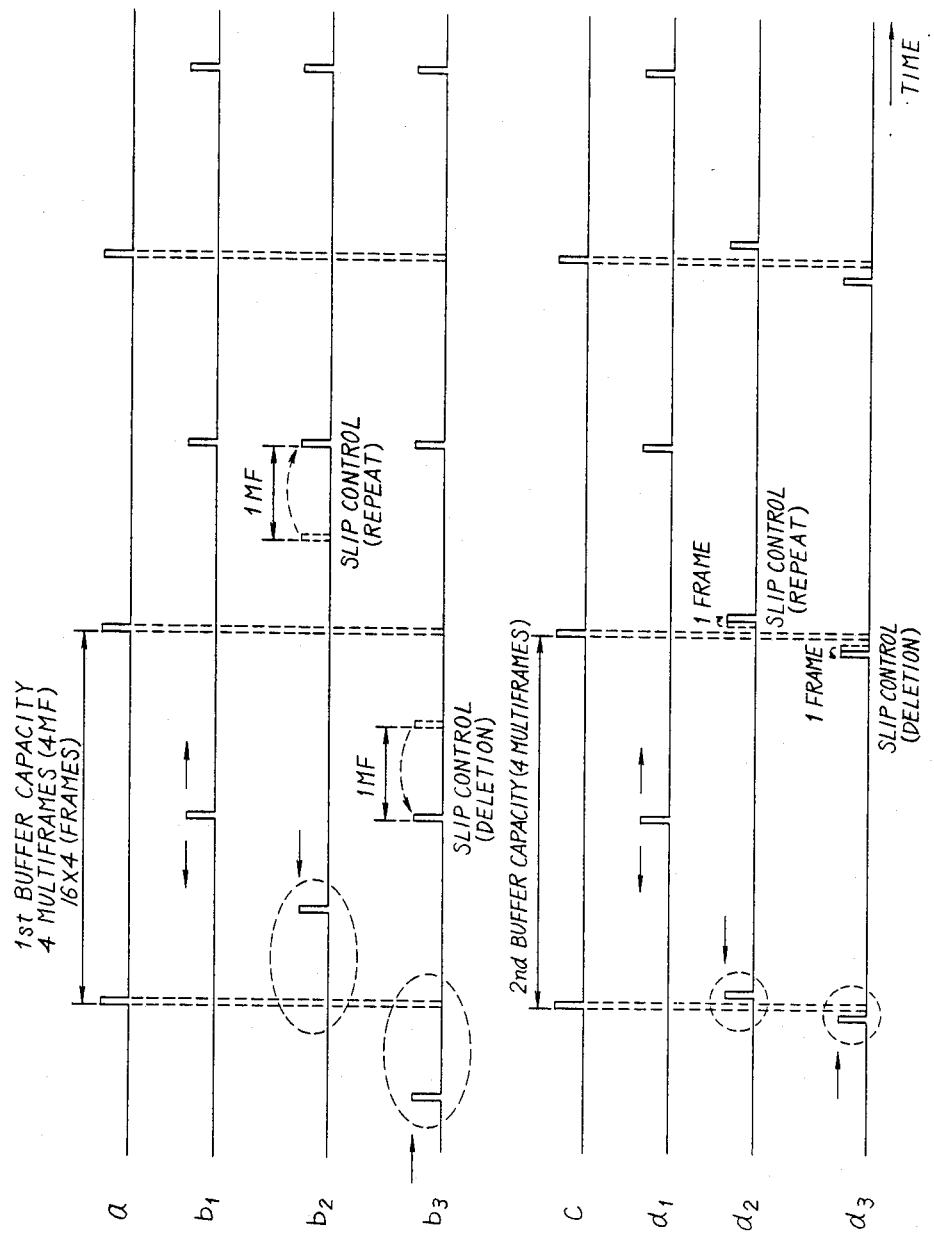
FIG. 3 is a time chart for use in describing operation of the plesiochronous buffer circuit illustrated in FIG. 1.

Referring to FIG. 3 together with FIGS. 1 and 2, the first slip control and the second slip control will now be described more in detail. The above-mentioned first writing phase signal is now indicated at a and is produced once for four multiframes at the first write timing of writing the first part in the leading address of the first buffer area of the buffer memory 11 as mentioned before. The above-mentioned first reading phase signal is indicated at $b_1$ is produced once for four multiframes at the first read timing of reading the first part in the leading address of the first buffer area of the buffer memory 11 as described above. In general, the first reading phase signal $b_1$ has a phase which is delayed by about two multiframes relative to the first writing phase signal a. As a result of the afore-described clock frequency difference which the buffer memory 11 should compensate for, the relative delay of the first reading phase signal $b_1$ may fluctuate in the manner symbolized by a pair of antiparallel arrows.

In FIG. 3, a reference symbol $b_2$ indicates the first reading phase signal which appears nearer to the first writing phase signal a than the first predetermined time interval of one multiframe in a direction indicated by an arrow. In such a case, the first comparing circuit 31 produces a first slip control signal of the type described. It may be mentioned here that the first buffer area of the buffer memory 11 has a memory capacity for four multiframes in the manner described before. The first buffer area can therefore be divisible into first through fourth memory sectors. Responsive to the first slip control signal, the first read control circuit 21 carries out a first slip control such that the buffer memory 11 is repeatedly supplied with the first read address signal representative of the fourth memory sector of the first buffer area. After such repeat of one multiframe, the first part is again read from the leading address of the first buffer area of the buffer memory 11. That is, the first part is read from the buffer memory 11 at a first slipped timing displaced relative to the first read timing by one multiframe in the manner indicated by a dashed-line pulse and a solid-line pulse labelled "slip control (repeat)."

In FIG. 3, a reference symbol $b_3$ indicates the first reading phase signal which happens to appear nearer to the first writing phase signal a than the first predetermined time interval of one multiframe in a counter direction indicated by another arrow (pointing to the right). In such a case, the first comparing circuit 31 produces another first slip control signal. Responsive to the other first slip control signal, the first read control circuit 21 carries out another first slip control such that the buffer memory 11 is not supplied with the first read address signal representative of the fourth memory sector of the first buffer area. After such deletion of one multiframe, the first part is again read from the leading address of the first buffer area of the buffer memory 11. That is, the first part is read from the buffer memory 11 at a first slipped timing displaced relative to the first read timing by one multiframe in the manner indicated by a dashed-line pulse and a solid-line pulse labelled "slip control (deletion)."

In FIG. 3, the above-mentioned second writing phase signal is indicated at c and is produced once for four multiframes at the second write timing of writing the second part in the leading address of the second buffer area of the buffer memory 11 as mentioned above. The above-mentioned second reading phase signal is indicated at $d_1$ and is produced once for four multiframes at the second read timing of the second part in the leading address of the second buffer area of the buffer memory 11 as described before. In general, the second reading phase signal $d_1$ has a phase which is delayed by about two multiframes relative to the second writing phase signal c. The delay may fluctuate as above in the manner indicated by two antiparallel arrows.

In FIG. 3, a reference symbol $d_2$ indicates the second reading phase signal which happens to appear nearer to the second writing phase signal c than the second predetermined time interval of one frame in a direction indicated by an arrow. In such a case, the second comparing circuit 32 produces a second slip control signal of the type described. It may be mentioned here as regards the second buffer area of the buffer memory 11 that the above-mentioned each memory sector is sixteen frames and that the second buffer area is divisible into first through sixty-fourth memory regions, each for one frame. Responsive to the second slip control signal, the second read control circuit 22 carries out a second slip control such that the buffer memory 11 is repeatedly supplied with the second read address signal representative of the sixty-fourth memory region of the second buffer area. After such repeat of one frame, the second part is again read from the leading address of the second buffer area of the buffer memory 11. That is, the second part is read from the buffer memory 11 at a second slipped timing displaced relative to the second read timing by one frame in the manner which is indicated by a dashed-line pulse and a solid-line pulse and labelled "slip control (repeat)."

In FIG. 3, a reference symbol $d_3$ indicates the second reading phase signal which appears nearer to the second writing phase signal c than the second predetermined time interval of one frame in a counter direction indicated by another arrow. In such a case, the second comparing circuit 32 produces another second slip control signal. Responsive to the other second slip control signal, the second read control circuit 22 carries out another second slip control such that the buffer memory 11 is not supplied with the second read address signal representative of the sixty-fourth memory region of the second buffer area. After such deletion of one frame, the second part is again read from the leading address of the second buffer area of the buffer memory 11. That is, the second part is read from the buffer memory 11 at a second slipped timing displaced relative to the second read timing by one frame in the manner indicated by a dashed-line pulse and a solid-line pulse labelled "slip control (deletion)."

Figure 4:
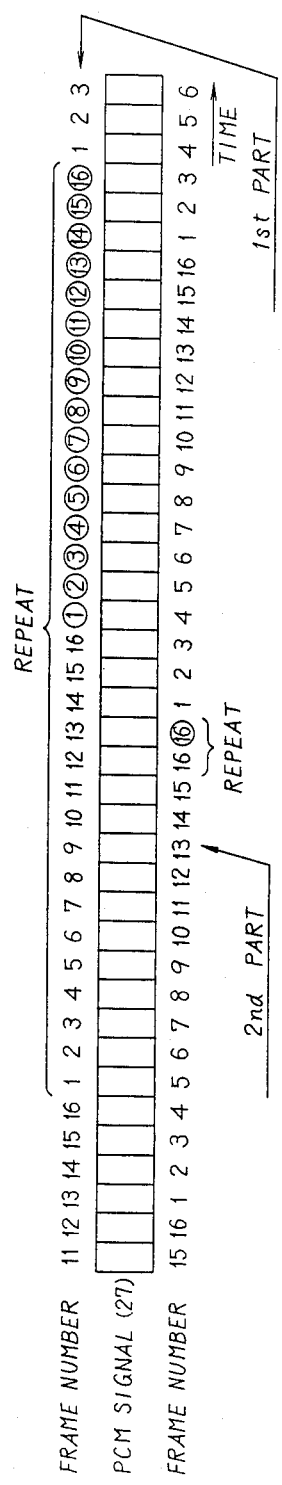
FIG. 4 is another time chart for use in describing operation of the plesiochronous buffer circuit illustrated in FIG. 1.

Referring to FIG. 4, the PCM signal 27 (FIG. 1) is shown which is obtained after the repeat of one multiframe for the first part by the first slip control and after the repeat of one frame for the second part by the second slip control. In FIG. 4, a frame positioned at the most left-hand end has a first part of an eleventh frame of a multiframe of a PCM signal 12 (FIG. 1) and a second part of a fifteenth frame of another multiframe. The repeat for the first parts is carried out as regards sixteen frames indicated by encircled frame numbers. The repeat for the second part is carried out for one frame indicated by an encircled frame number.

While this invention has thus far been described in conjunction with a preferred embodiment thereof, it will readily be possible for those skilled in the art to put this invention into practice in various other manners. For example, the plesiochronous buffer circuit can be used in a PCM signal which comprises a first data signal comprising other data instead of the signalling data and a second data signal comprising other data instead of the telephone voice signals.

What is claimed is:

1. A plesiochronous buffer circuit for use in an earth station in coupling a domestic digital network and a satellite network, said domestic digital network being operable in synchronism with a series of station clocks having a first clock frequency, said satellite network being operable in synchronism with a series of satellite clocks having a second clock frequency, said buffer circuit comprising a buffer memory for compensating for a clock frequency difference between said first and said second clock frequencies when said buffer circuit receives a PCM signal through one of said domestic digital and said satellite networks and transmits said PCM signal to the other of said domestic and said satellite networks in synchronism with transmission clocks, said PCM signal being received by said buffer circuit in synchronism with reception clocks extracted from the PCM signal and comprising a plurality of multiframes each of which comprises a first and a second part, the first part of a predetermined one of the frames of each multiframe comprising a multiframe synchronization signal, the first part of each of the other frames of each multiframe comprising a first digital signal, said second part comprising a second data signal, said reception clocks being substantially equal in frequency to one of said station clocks and said satellite clocks that is received through said one of the domestic digital network and the satellite network while said transmission clocks substantially are equal in frequency to the other clocks of said station clocks and said satellite clocks that are transmitted through the other of said domestic digital and said satellite networks, said buffer circuit comprising:

means responsive to said PCM signal for individually detecting said first and said second parts of the PCM signal with reference to the reception clocks;

first partial write controlling means for controlling a write-in operation of said first part of the PCM signal in accordance with said reception clocks;

second partial write controlling means for controlling a write-in operation of said second part of the PCM signal in accordance with said reception clocks;

means coupled to said first and said second partial write controlling means and said buffer memory for individually sending said first and said second parts of the PCM signal to said buffer memory;

first partial read controlling means responsive to said transmission clocks for controlling a readout operation of said first part in accordance with said transmission clocks;

second partial read controlling means for controlling a readout operation of said second part in accordance with said transmission clocks; and means coupled to said first and said second partial read controlling means and said buffer means for carrying out a readout operation of said buffer memory to selectively read said first and said second parts out of said buffer memory, respectively.

2. A plesiochronous buffer circuit as claimed in claim 5, wherein said first partial write controlling means comprises first writing phase signal producing means for producing a first writing phase signal at a first write timing of said first part in said buffer memory, said second partial write controlling means comprising second writing phase signal producing means for producing a second writing phase signal at a second write timing of said second part in said buffer memory, said first partial read controlling means comprising first reading phase signal producing means for producing a first reading phase signal at a first read timing of said first part from said buffer memory, said second partial read controlling means comprising second reading phase signal producing means for producing a second reading phase signal at a second read timing of said second part from said buffer memory.

3. A plesiochronous buffer circuit as claimed in claim 3, further comprising first comparing means for comparing said first writing and said first reading phase signals to produce a first slip control signal when said first writing and said first reading phase signals become nearer to each other than a first predetermined time interval and second comparing means for comparing said second writing and said second reading phase signals to produce a second slip control signal when said second writing and said second reading phase signals become nearer to each other than a second predetermined time interval, said first partial read controlling means being responsive to said first slip control signal to carry out a first slip control such that said first part is read from said buffer memory at a first slipped timing displaced relative to said first read timing by one multiframe, said second partial read controlling means being responsive to said second slip control signal to carry out a second slip control such that said second part is read from said buffer memory at a second slipped timing displaced relative to said second read timing by one frame.

* * * * *

UNITED STATES PATENT AND TRADEMARK OFFICE
CERTIFICATE OF CORRECTION

PATENT NO.  : 4,764,942

DATED       : August 16, 1988

INVENTOR(S) : Seiichiro Shigaki, Minoru Matsuoka, Osamu Ookoshi

It is certified that error appears in the above—identified patent and that said Letters Patent is hereby corrected as shown below:

Column 12, line 4, "5" should read --1--.

Column 12, line 21, "3" should read --2--.

Signed and Sealed this

Tenth Day of January, 1989

Attest:

DONALD J. QUIGG

*Attesting Officer*          *Commissioner of Patents and Trademarks*